C. C. WELLS.
Wheel Cultivator.
No. 52,348. Patented Jan. 30, 1866.
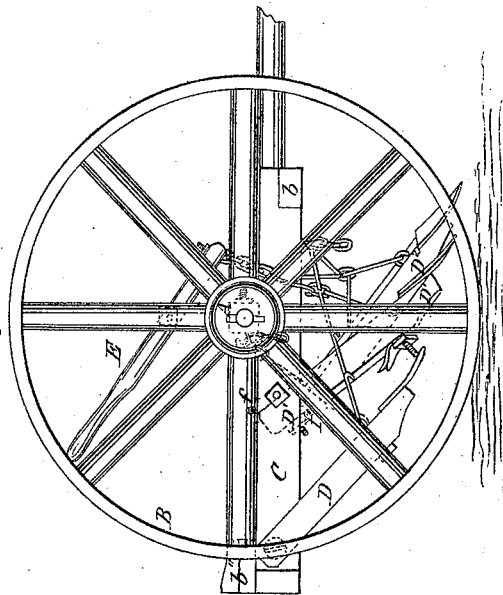
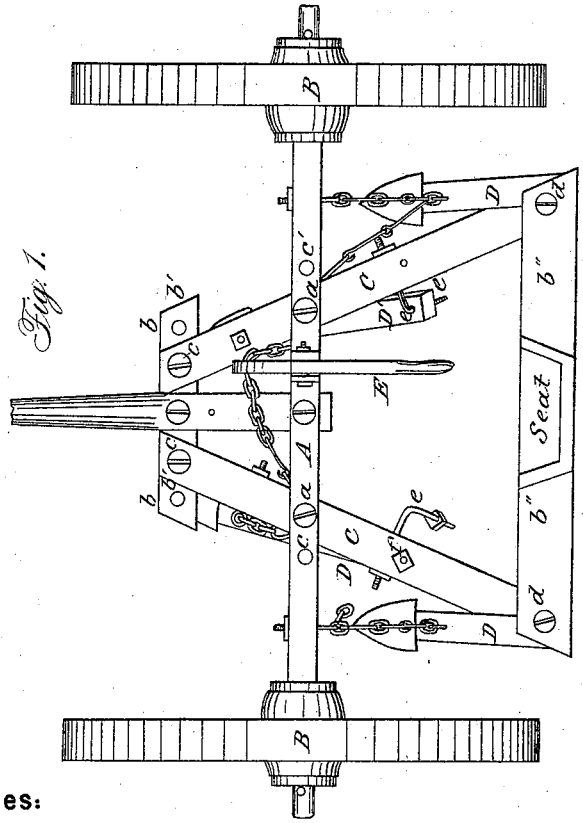
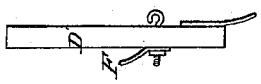
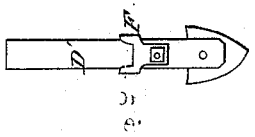
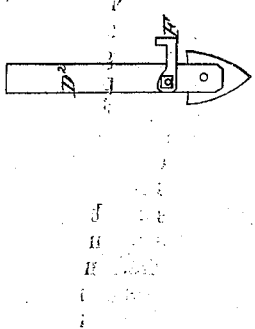
Witnesses:
W. Burris
James E. Fitch

UNITED STATES PATENT OFFICE.

CHARLES C. WELLS, OF LYONS, IOWA.

IMPROVEMENT IN CULTIVATORS.

Specification forming part of Letters Patent No. 52,348, dated January 30, 1866.

*To all whom it may concern:*

Be it known that I, CHARLES C. WELLS, of the city of Lyons, in the county of Clinton and State of Iowa, have invented a new and useful Improvement in Cultivators; and I do hereby declare the following to be a full, clear, and exact description of the construction and operation of the same, reference being had to the accompanying drawings, making a part of this specification, in which—

Figure 1 is a plan view of my improved cultivator; Fig. 2, a side view of the same; Fig. 3, detached rear view of the plow or shovel standard, showing one form of stirrup as applied thereto, which will hereinafter be more particularly described; Fig. 4, rear view of standard, showing another form of stirrup as applied to the same; Fig. 5, side view of standard and stirrup.

Like letters in all figures of the drawings indicate like parts.

The nature of my improvement consists in making a frame for a wheel-cultivator simple, light, and substantial in its construction and arrangement, and thereby the better enable it to be handled in its operation or otherwise with facility and ease—the parts constituting the frame, and the parts appertaining thereto, being simply what may be termed the "front wheels," and its appurtenances, in connection therewith, of the fore part of the running-gear of a wagon, as adapted to and for the purpose of a cultivator, the difference in this case being that the beams commonly used and known as "hounds," in a wagon, instead of being made rigid, as in that, are made adjustable by means of movable bolts and holes, so that the standards attached thereto, and to which the shovels or teeth are attached, may be regulated to suit the width of rows or mark the same when desired. Another feature of my improvement is that the said standards, in their connection with the hounds, may, either the one or the other, or both, be shifted, as may be desired, from one position to another by means of elbow or bent bolts or straight ones with hooked ends, placed in holes in the hounds for the purpose of turning the standard or standards, to which the shovels are attached, inwardly to the row of corn to be cultivated, so as to throw the dirt therearound or therefrom, as occasion may require, the angular form of the hound as arranged giving the inward inclination of the shovel to the row when the standard or standards are placed on the elbow-bolts, as above mentioned. Also, another feature of my improvement is in the application of stirrups behind the standards to enable the same to be adjusted laterally by the feet of the operator or driver, or so directed by the feet as to prevent the standards or the shovels from injuring the corn when the same is large.

I am aware of frames in many cultivators being constructed similarly to this, but they are generally of a heavy complicated form, as well as being complex in their adjustment in regulating the teeth or shovels to suit width of row, &c., as may be desired; and they are not used, as far as my observation extends, in combination with a single axle for straddling the rows of corn, as this is designed to do, being substantially the same as the front wheels, tongue, and hounds of a wagon, the hounds being adjustable instead of being fixed; or this part of the wagon may be so constructed as to be adapted for either wagoning or cultivating purposes by attaching or detaching the standards when desired.

To enable any one skilled in the art to make and use my invention, I will proceed to describe its construction and operation.

A is the axle, B B the wheels, C C the hounds, (see Fig. 1,) which are placed in the same relative position as those in a wagon, either on or under the axle, as may be deemed best, and secured thereto by movable bolts *a a* with screw-nuts. The front ends of the hounds are also secured to a transverse beam, *b*, by movable bolts *c c*, the same as that on the axle. This beam extends out on both sides from the hounds at a proper distance, with holes *b' b'* near each end to receive the movable bolts, and holes *c' c'*, of a corresponding size and distance, are made in the axle on both sides of the hounds to receive the first above-mentioned bolts. The rear ends of the hounds are secured to a flat transverse beam, *b''*, of a sufficient width to admit of a driver or operator's seat being placed thereon, by pivot-bolts *d d*, to allow a free play at this end of the hounds when the front is spread out.

D D' D² D are the standards, having the ordinary plow-teeth or shovels attached at their lower ends. The outer standards (see Fig. 1) are secured to the rear outer sides of the hounds by fixed bolts, and the inner ones, one on the inner side of the hounds D' and the other on the under opposite side of the same, D².

At the point where the inner standards are attached to the hounds will be seen two elbow-bolts, e e, with screw-nuts passed through holes made in the hounds from the sides, the elbow parts being on the inner side of the hounds and so turned, when the standards are placed thereon, as to give the proper position to them. These elbow-bolts are used (either one or the other, or both) when it is desired to incline the standard or standards inwardly to the rows of corn, and thereby throw the dirt more fully around the same. One of the standards, D', is shown on the elbow part of the bolt, as seen clearly in Fig. 1. A hole of sufficient size is made through near the end of the standard and the bolt passed through, by which it is held and secured by a screw-nut, the position of the standard, as thus placed, giving the inward inclination to the shovel or teeth attached to the standard, as above mentioned. The standard D² on the under opposite side (which may be seen partially in dotted lines in Fig. 2) of the hound is attached thereto by a straight bolt, f, with hooked end passed through from the bottom of the hound and secured on the top of the same by a screw-nut, the hook portion of it being inserted in a staple or other similar device placed at or on the end of the standard. From this it will be seen that the standards can be shifted at any time with but little trouble from a position in a line with the draft, or to one at an inclination or angle with the said line, for the purpose as hereinbefore mentioned.

F F are the stirrups. They are applied to the rear of the standards (see Figs. 3, 4, and 5) at such a distance from the rear transverse beam in the center thereof, where the driver's seat is located, as will be convenient to the placing of his feet thereon or therein. The stirrup in Figs. 4 and 5 is used when the corn is large, and is also used for boys who may be operating the machine and whose legs are not so long as those of a man, or the latter, if his legs are shorter than the ordinary length, its peculiar construction and location enabling a short-legged person, or even otherwise, to control the standard to which the plow-shovel is attached, and thereby regulate it in whichever direction needed. This stirrup is so constructed as to project outwardly from the rear of the standard, (see Fig. 5,) having a sufficient depression or opening to receive the foot therein, and is secured to the standard by a bolt and screw-nut. The stirrup, as seen in Fig. 3, is used when the corn is not large, and for such operators as have the ordinary size legs. It projects inwardly and outwardly from the standard, and secured thereto in like manner as the other. This one is different in construction from the other, it being straight with an upper projection out from its end sufficiently to prevent the foot from slipping thereoff.

I do not confine myself to the particular form of stirrup here described, nor to its particular location, except as applied to the standards, as they may be made of different forms and applied differently to that here mentioned.

The standards are suspended from the hounds and axle by suitable chains and rods, and the depth of the shovels or teeth is regulated by the lever E.

Operation: The driver or operator takes his seat in the center of rear transverse beam, the same having a suitable back and sides, and by placing his feet in the stirrups he is enabled to move the shovels in whichever direction he wishes, laterally or even forward, in case of meeting with an obstruction, by simply pushing the standard up in that direction with his foot, and thereby probably save the necessity of raising the same with the lever, or the quicker to raise it by using the lever in connection with the foot at the same time.

If required to adapt the shovels to the right position in cultivating the corn or marking out the ground for seeding the same is done by removing the bolts and spreading the front ends of the hounds out to the holes desired, when the bolts are replaced.

Having thus fully described my invention, what I claim therein as new, and desire to secure by Letters Patent, is—

1. So constructing and arranging the hounds C C, front cross-beam, b, and rear beam, b'', in combination with the axle A, that the same may be adjusted by the movable bolts and holes, substantially in the manner and for the purpose herein set forth.

2. Constructing and arranging the standards D' D², in connection with the hounds, so that they may be shifted from the straight bolts f f to the elbow ones e e, substantially in the manner and for the purpose herein set forth.

3. The application of the stirrups F F to the rear of the standards D' D², substantially in the manner and for the purpose herein set forth.

4. The combination of the lever E with the stirrups F F and standards D' D², for raising the latter in conjunction with the feet, substantially in the manner and for the purpose as herein set forth.

5. The arrangement of the rear cross-beam, b'', in combination with the stirrups and standards, so that the latter may be moved in a lateral direction independent of each other, substantially in the manner and for the purpose herein set forth.

CHARLES C. WELLS.

Witnesses:
M. B. PELTON,
A. C. ROOT.